Sept. 24, 1940.  J. M. RANGER ET AL  2,215,839
TRAILER COUPLER
Original Filed April 30, 1936   3 Sheets-Sheet 2
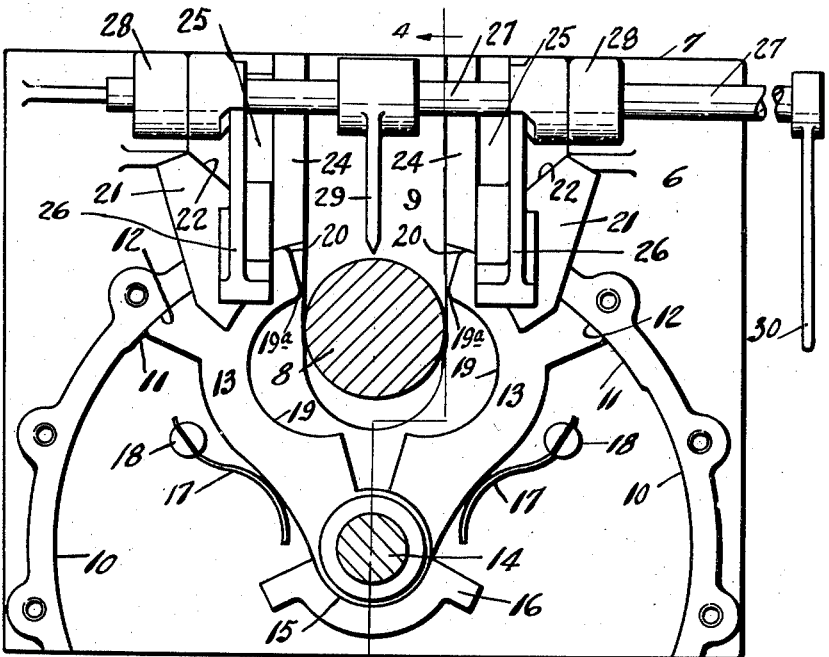
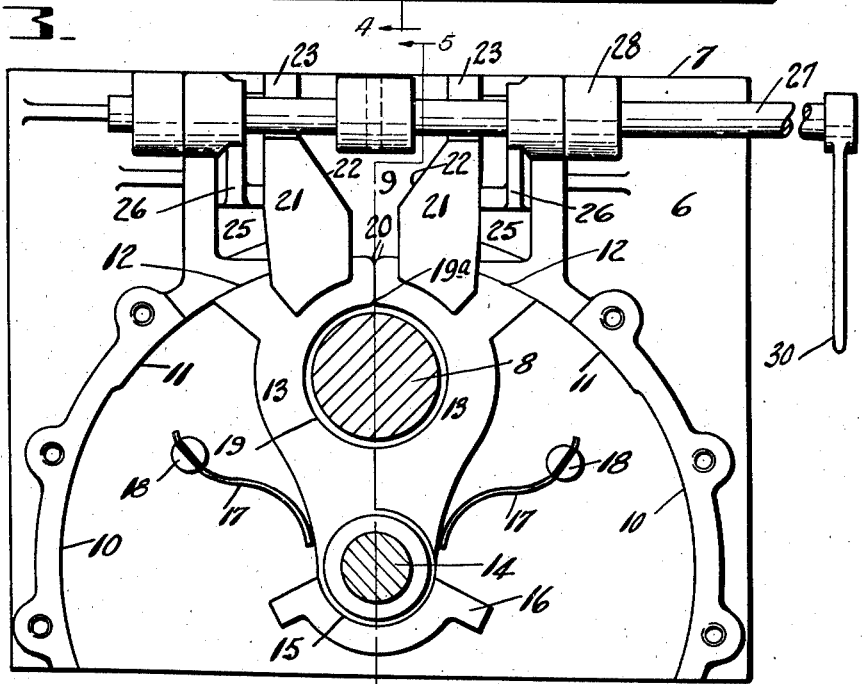
INVENTOR
James M. Ranger
George W. Ranger
BY Charles W. Dake
ATTORNEY Sept. 24, 1940. J. M. RANGER ET AL 2,215,839
TRAILER COUPLER
Original Filed April 30, 1936 3 Sheets—Sheet 3
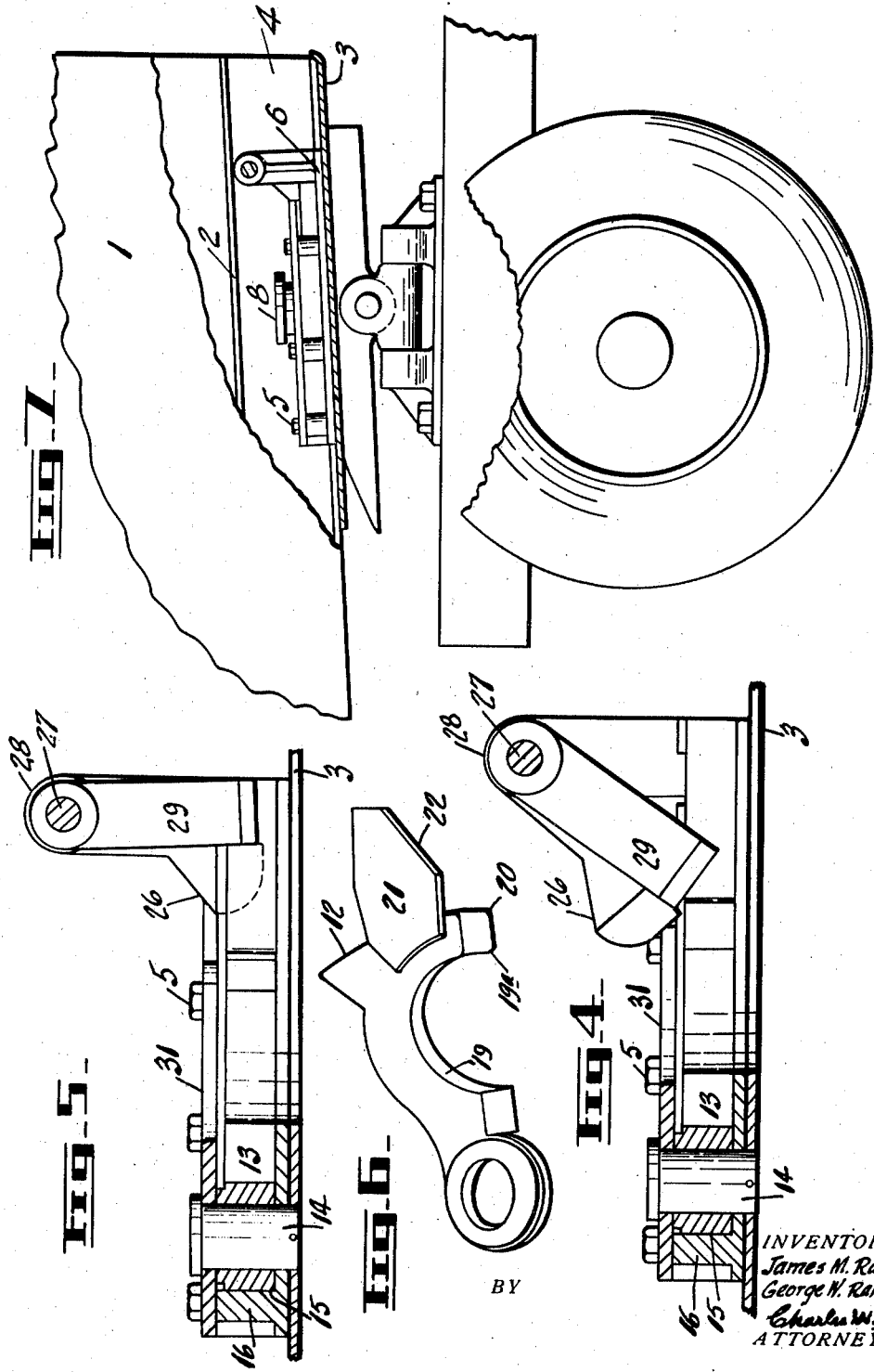
INVENTOR
James M. Ranger
George W. Ranger
Charles W. Dake
ATTORNEY Patented Sept. 24, 1940

2,215,839

UNITED STATES PATENT OFFICE 2,215,839

TRAILER COUPLER

James M. Ranger and George W. Ranger, Muskegon, Mich.; Mertha I. Ranger administratrix of said James M. Ranger, deceased Application April 30, 1936, Serial No. 77,207
Renewed April 14, 1938

5 Claims. (Cl. 280—33.1)

The present invention relates to improvements in trailer couplers wherein horizontally separable pivoted jaws act in conjunction with a king-bolt to detachably connect the trailer to the tractor, and the objects of improvement are, first, to provide a coupler wherein the pull load of the tractor will be borne by an abutment; second, to provide a coupler that will be securely locked against accidental disconnection; third, to provide a coupler that will automatically lock to the king bolt of the tractor when the tractor is backed for coupled engagement with the trailer; fourth, to provide a coupler of simple construction; fifth, to provide a coupler that is simple to manipulate; sixth, to provide a coupler that is safe against accidental disconnection; seventh, to provide a coupler that is safe to manipulate by the operator; and eighth, to provide a coupler that is cheap to manufacture.

These objects and others not here enumerated are attained by the structure illustrated in the accompanying drawings taken in connection with the description thereof in which:

Figure 2 is a plan view with the enclosing cover removed and the parts in their position when in the act of automatically coupling.

Figure 3 is a plan view as of Figure 2 with the parts in locked position, as when coupling is completed with the jaws engaging the king bolt.

Figure 4 is a sectional view taken on line 4—4 of Figure 2 with the parts in unlocked position.

Figure 5 is a sectional view taken on line 5—5 of Figure 3 with the parts in locked position.

Figure 6 is a perspective view of one of the king bolt engaging jaws, and

Figure 7 is a fragmentary view showing the coupler installed on a trailer which is connected to the tractor.

Throughout the several views, similar numerals refer to similar parts as follows:

Figure 1:
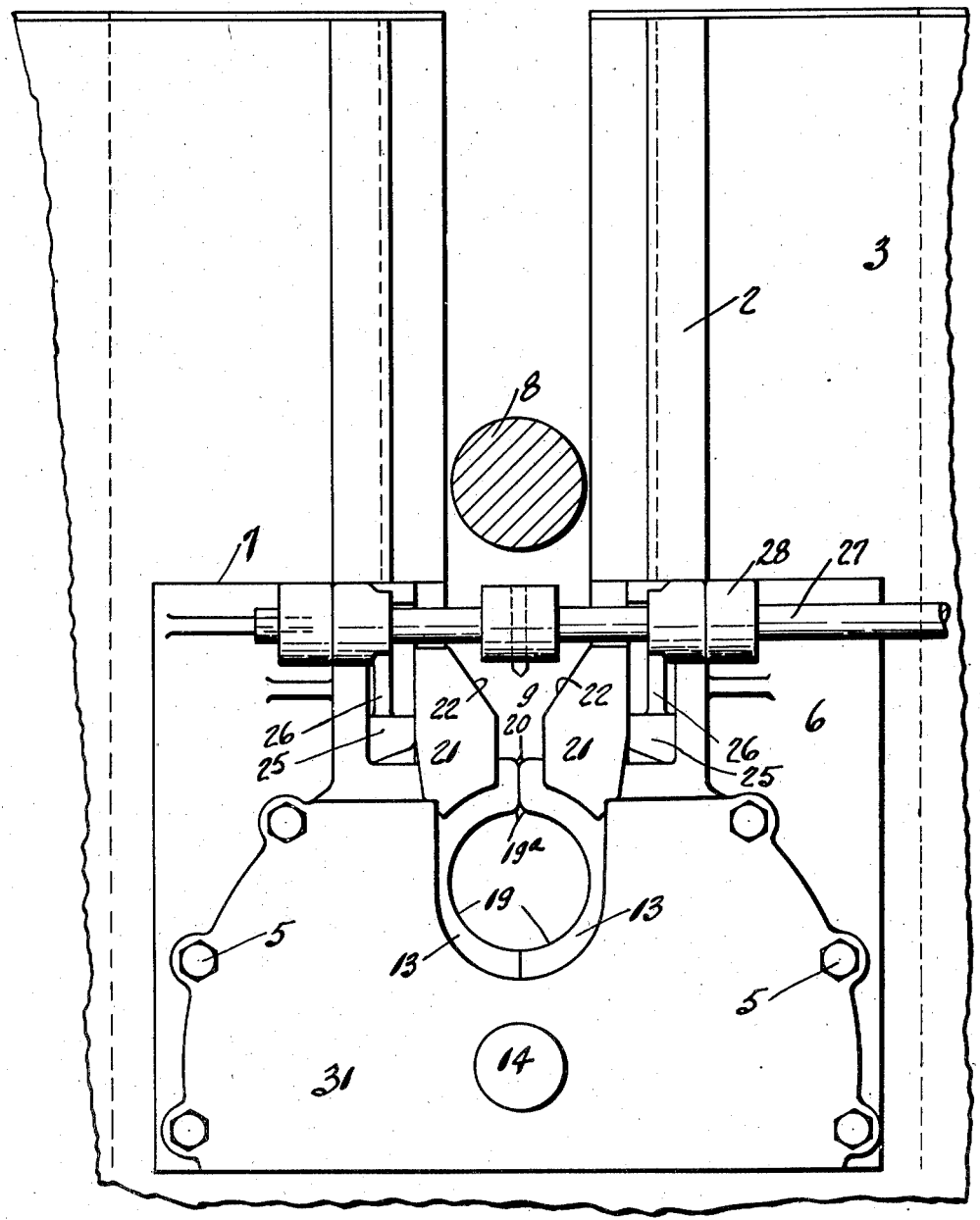
Figure 1 is plan view with the parts shown in their position for coupling and illustrating certain parts of the trailer structure.

1 represents a broken or fragmentary section of the trailer body supported by channel sill members 2, to the under side of which is secured as by rivets or electric weld, coupler supporting plate 3 extending the width of the trailer body under the channel sill members 2. Also fastened to extension channel members 4, at the top side of the supporting plate 3 and secured thereto as by bolts 5 is the coupler base 6 having extending from its front side 7 to back of the locked location of the king pin 8, slot 9. Beginning at each side of the slot 9, intermediate its length and extending therefrom in a circular direction is upwardly disposed load carrying flange 10 having a machined portion 11 engaged by the correspondingly curved front ends 12 of the king pin engaging jaws 13, pivoted on jaw anchor pin 14. The jaws 13 encircling the pin 14 have rounded end extended portions 15, each substantially one-half the normal thickness of the respective jaw. Upwardly extending curved flange 16 integral with the base 6 embraces the rounded end portions 15 of the jaws 13 and receives the thrust of the tractor in coupling or when backing. Springs 17 supported by studs 18 force the jaws 13 to their closed position, as shown in Figures 1 and 3, in which position the king pin 8 is engaged by the semicircular portion 19 of each jaw. The semi-circular portion at the juncture of each jaw in front of the king pin is chamfered as shown by 19a and also at 20. At the top of each of the jaws 13 extending toward the front of the coupler base 6 is jaw spreading members 21 having relatively inclined king pin engaging surfaces 22. Extending from the load carrying flange 10, at each side of the slot 9, to the front of the base 6 are upwardly disposed ribs 23 and in parallel spaced relation to the ribs 23 are ribs 24 forming pockets 25 therebetween. The ribs 23 and 24 at the opposite sides of the pockets engage the locking levers 26, secured to the shaft 27 turnable in the brackets 28, extending upwardly from the base 6 at the ribs 24. Intermediate the locking levers 26 on the shaft 27 and secured thereto is automatic unlocking lever 29 and at the end of the shaft 27, extending at the side of the trailer, is lever 30 whereby the shaft 27 may be manually turned, turning to swing the locking levers 26 out of engagement with the locking pockets 25, and turn the automatic locking lever 29 into engagement with chamfers 20 thus slightly spreading the jaws 13 apart. Cover plate 31 secured to the top of flange 10 supports the anchor pin 14 at one of its ends, also prevents accumulation of road dust and grit around the king pin engaging jaws.

In the use of our improved trailer coupling the king pin is carried by the tractor and usually is secured to the bolster plate or fifth wheel of the tractor, which is provided with two or more traction wheels, and the coupler carried by the trailer of the truck and secured thereto as previously described. The trailer having but two road wheels located near the rear end, the front end, when uncoupled from the tractor is therefore supported usually by a tripod at the required height for coupling to the tractor and in coupling the two, the tractor is backed under the trailer with the king pin in alignment with the slot 9 into which it enters as the tractor is backed. Upon backing the tractor, the king-pin entering the coupler engages the automatic unlocking lever 29 turning the shaft 27, and swings the lower ends of the locking levers 26 out of the pockets 25. A further backing of the tractor causes the lower end of the automatic unlocking lever to enter between the chamfers 20 of the jaws 13 and slightly moving the jaws apart when further backing of the tractor causes the king pin to engage the incline surfaces 22 of the jaw spreading members and as the king pin is moved back by the backing of the tractor, the jaws 13 are spread apart by the king pin sufficiently to allow the king pin to pass into the opening between the ends of the semi-circle portions 19 and as the king pin is forced back into the opening bounded by the semi-circle portions, the springs 17 force the jaws in engagement with the king pin in which position the locking levers 26 enter the pockets 25 outside the extensions 21, thus securely locking the extensions 21 against outward movement and consequently the jaws 13, of which they are integral parts, around the king pin and also in contact engagement with each other.

When uncoupling the tractor from the trailer, the tripod referred to, or other support employed is positioned under the front end of the trailer. The lever 30 is raised turning the shaft 27, thereby swinging the lower ends of the locking levers 26 out of the pockets 25 thus unlocking the extensions 21 of the jaws 13 and swinging the automatic unlocking lever 29 until its lower end enters the chamfers 20 between the jaws 13 slightly separating the jaws, and the tractor being moved forward causes the king pin to contact the chamfers 19a thereby spreading the jaws apart until the king pin is withdrawn from between the jaws, when further forward movement of the tractor disengages the tractor from the trailer. As the king pin is removed from between the jaws 13, the springs 17 cause the jaws to resume their locked position, in which position the locking levers 26 again enter into the pockets 25 and the automatic unlocking lever will again be in its vertical position for engagement with the king pin for uncoupling.

We claim:

1. In a trailer coupling, the combination with trailer and tractor portions of a vehicle, a king pin carried by the tractor portion and a coupler base member carried by the trailer portion, a slot in the base member for guiding the king pin during the coupling of the tractor to the trailer, a pair of king pin engaging jaws in opposed relation pivotally connected to a common pivot pin carried by the base member and having their respective ends connected to the pivot pin rounded, an upwardly extending flange integral with the base member engaging the respective rounded ends of said king pin engaging jaws, the said jaws having their respective free ends curved in the form of an arc having a radius emanating from the axis of said pivot pin and an upwardly extending curved flange integral with the base member engaging the said free ends of said king pin engaging jaws, each of said jaws having a locking member extending from its free end, said locking members having opposed sides inclined to the line of separation between the said king pin engaging jaws, and their opposite sides substantially parallel with the said line of separation, upwardly extending brackets on the base member, a shaft turnable in said brackets and having secured thereto and swingable thereby locking members locking said jaws engaging the said king pin by engaging the said parallel sides of the said extensions on said jaws, an unlocking lever for swinging said locking levers out of engagement with said jaw locking members on said jaws and a lever on said shaft for manually turning the said shaft.

2. In a trailer coupling in combination with trailer and tractor portions of a vehicle, a king pin carried by the tractor and a base member carried by the trailer, a slot extending into the base member for guiding the king pin into the base member during the coupling of the tractor to the trailer, king pin engaging jaws pivotally connected to a pivot pin on the base member in spaced relation to said slot and rounded at their ends surrounding the said pivot pin and having their free ends curved in the form of an arc having a radius emanating from the axis of said pivot pin, each jaw provided with locking extension at their free ends, said extensions having respective opposed sides inclined in relation to the line of separation of the said jaws, and their outer respective sides substantially parallel with said line of separation, upwardly extending brackets on the base member, a shaft turnable in said brackets and having secured thereto and swingable, thereby locking members locking said jaws engaging the said king pin by engaging the said parallel sides of the said extensions on said jaws, an unlocking lever for swinging said locking levers out of engagement with said extensions on said jaws and a lever on said shaft for manually turning the shaft to manually swing the locking levers and two pockets on said base member each adapted to receive one of said locking levers.

3. In a trailer coupler, the combination with trailer and tractor portions of a vehicle, a king pin carried by the tractor portion of a coupler base member carried by the trailer portion, a pair of king pin engaging jaws in opposed relation pivotally connected to a single anchor pin carried by the base member, the said jaws being rounded at their ends adjacent their pivotal connection to said anchor pin and a flange on said base member engaging said rounded ends of said jaws, each of said jaws having a free end curved in the form of an arc having a radius emanating from the axis of their pivotal connection to said anchor pin, the said free end of each of the said jaws engaging an upwardly extending correspondingly curved flange on the said base member and each of said jaws having a locking extension at its free end whereby the said jaws may be locked against disengagement with the said king pin, means for engaging the locking extensions on said jaws for locking the jaws in closed position, and lock releasing means positioned to be engaged by the king pin as it approaches said jaws during coupling movement for releasing the jaws for opening movement.

4. In a trailer coupler, the combination with trailer and tractor portions of a vehicle, a king pin carried by one of said portions and a coupler base member carried by the other of said portions, a pair of king pin engaging jaws in opposed relation pivotally connected at one of their respective ends to said base member, the opposite ends of said jaws being separable, and upwardly extending flanges on the said base member engaging the separable ends of the said jaws and an upwardly extending flange engaging the connected ends of the respective jaws, the said upwardly extending flanges forming abutments for said king pin engaging jaws, swingable locking levers engaged with the separable ends of the jaws to restrain the jaws against opening movement, manual means for engaging the levers with the jaws, and means operable by the king pin as it approaches the separable ends of the jaws for moving the levers clear of the jaws to permit opening thereof.

5. In a trailer coupler, the combination with trailer and tractor portions of a vehicle, a base member supported by one of said portions, separable king pin engaging jaws associated with the base member, springable means for moving the said jaws in engagement with the king pin and swingable locking levers engaging the said jaws for locking the said jaws in engagement with the said king pin and means for swinging said levers from engagement with said jaws, the said levers supported by a shaft associated with the said base member and having intermediate the said locking levers on said shaft a lever separate from said swinging levers whereby the said shaft is turned when the said last mentioned lever is engaged by the king pin.

JAMES M. RANGER.
GEORGE W. RANGER.